(12) United States Patent
Tay et al.

(10) Patent No.: US 10,703,317 B2
(45) Date of Patent: Jul. 7, 2020

(54) ARMREST ASSEMBLY WITH ENGINEERED LATERAL BENDING STIFFNESS

(71) Applicant: FORD GLOBAL TECHNOLOGIES, LLC, Dearborn, MI (US)

(72) Inventors: Yi Yang Tay, Warren, MI (US); Linh Doan, Dearborn, MI (US); Bhavani Thota, Novi, MI (US); Li Lu, Bloomfield Hills, MI (US); Michael Gerard Orlowsky, Macomb, MI (US); Brian Pietila, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/031,569

(22) Filed: Jul. 10, 2018

(65) Prior Publication Data
US 2020/0017053 A1    Jan. 16, 2020

(51) Int. Cl.
B60R 21/04       (2006.01)
B60N 2/427      (2006.01)
B60N 2/42        (2006.01)
B60N 2/75        (2018.01)

(52) U.S. Cl.
CPC ........ B60R 21/0428 (2013.01); B60N 2/4235 (2013.01); B60N 2/42709 (2013.01); B60N 2/78 (2018.02)

(58) Field of Classification Search
CPC ...... B60J 5/0461; B60J 5/0426; B60J 5/0451; B60J 5/0413; B60R 13/0243; B60R 21/04; B60N 2/78
USPC .................... 296/146.7, 187.05, 187.12, 153
See application file for complete search history.

(56) References Cited

U.S. PATENT DOCUMENTS

| | | | |
|---|---|---|---|
| 7,775,584 B2* | 8/2010 | Hughes, Jr. .............. | B60N 2/78 296/187.05 |
| 8,123,280 B2* | 2/2012 | Hori ........................ | B60N 2/78 296/153 |
| 8,172,311 B2 | 5/2012 | Hughes, Jr. et al. | |
| 9,114,773 B2* | 8/2015 | Sundararajan ........... | B60N 2/78 |
| 9,145,076 B2* | 9/2015 | Platzek ................ | B60N 2/4235 |
| 10,457,178 B2* | 10/2019 | Shimizu ................... | B60N 3/00 |

(Continued)

FOREIGN PATENT DOCUMENTS

| | | |
|---|---|---|
| CN | 203780474 U | 8/2014 |
| JP | H11286232 A | 10/1999 |
| JP | 2001122007 A | 5/2001 |

(Continued)

OTHER PUBLICATIONS

English Machine Translation of CN203780474U.

(Continued)

Primary Examiner — Pinel E Romain
(74) Attorney, Agent, or Firm — David Coppiellie; King & Schickli, PLLC

(57) ABSTRACT

An armrest assembly includes a body outlining a crushable space. The body includes a first deformation initiating feature, a second deformation initiating feature, a deformation propagating feature and a fracture initiating feature provided at spaced locations around the crushable space. The features function to dissipate energy in the event of a side impact and therefore force or load that might be transmitted to a motor vehicle occupant as a result of a side impact.

18 Claims, 6 Drawing Sheets

(56) References Cited

U.S. PATENT DOCUMENTS

2018/0065519 A1* 3/2018 Inami ...................... B60N 2/78

FOREIGN PATENT DOCUMENTS

| | | |
|---|---|---|
| JP | 2002046520 A | 2/2002 |
| JP | 2004291828 A | 10/2004 |
| JP | 2007283799 A | 11/2007 |

OTHER PUBLICATIONS

English Machine Translation of JP2001122007A.
English Machine Translation of JP2002046520A.
English Machine Translation of JP2004291828A.
English Machine Translation of JP2007283799A.
English Machine Translation of JPH11286232A.

* cited by examiner

ARMREST ASSEMBLY WITH ENGINEERED LATERAL BENDING STIFFNESS

TECHNICAL FIELD

This document relates generally to the motor vehicle equipment field and, more particularly, to an armrest assembly that provides controlled/reduced armrest lateral bending stiffness in a side impact event by means of engineered armrest deformation behavior.

BACKGROUND

Abdomen deflection is one of the critical elements taken into consideration when assessing the side impact performance of a motor vehicle. There are generally two accepted options for reducing abdomen deflection resulting from a side impact. The first option is to make modifications to the body structures. This can be done by increasing body side reinforcement, pillar reinforcement and/or adding or increasing the strength of an intrusion beam in the door of the motor vehicle. All such modifications to body structure add significant cost and have significant weight implications that have an adverse effect upon the fuel economy of the motor vehicle.

The second option to improve side impact performance of the motor vehicle relates to the management of energy absorption through the interior door trim panel. This can be achieved with negligible cost and weight penalties to the motor vehicle. Armrest design is a particularly important aspect of this second option.

This document relates to a new and improved armrest assembly that has been engineered through the incorporation of one or more deformation initiating features, one or more deformation propagating features, one or more fracture initiating features and a cooperating crushable space to allow maximum energy absorption during side impact by controlling the timing, location and shape of the deformation. Advantageously, the armrest assembly effectively lowers the peak force and distributes the force from a side impact over a longer timeframe, thereby improving safety.

SUMMARY

In accordance with the purposes and benefits as described herein, a new and improved armrest assembly is provided. That armrest assembly comprises a body outlining a crushable space. That body includes a first deformation initiating feature, a deformation propagating feature and a fracture initiating feature provided at spaced locations around the crushable space.

The body may include an outer wall and a support shelf inside the outer wall. An inner margin of the support shelf borders the crushable space. The first deformation initiating feature may be provided in the outer wall. More particularly, the first deformation initiating feature may be provided in the outer wall on an inboard side of the crushable space. For purposes of this document the terms inboard and outboard are defined with reference to the motor vehicle incorporating the armrest assembly.

The deformation propagating feature may be provided in the support shelf. More particularly, the deformation propagating feature may be provided in the inner margin of the support shelf on an inboard side of the crushable space.

The fracture initiating feature may be provided in the outer wall. More particularly, the fracture initiating may be provided in the outer wall along the end of the outer wall extending between the inboard side and an outboard side of the outer wall.

More particularly, the outer wall may include a curve at the intersection of the inboard side and the end. A second deformation initiating feature may be provided at this curve.

The deformation propagating feature may include a first section adjacent the first deformation initiating feature and a second section adjacent the second deformation initiating feature. Still further, the deformation propagating feature may include a third section spaced from the first section and the second section. The deformation propagating feature may also include a fourth section spaced from the other three sections.

In at least one of the many possible embodiments of the armrest assembly, the first section of the deformation propagating feature may comprise a first scallop in the support shelf. The second section of the deformation propagating feature may comprise a second scallop in the support shelf. The third section of the deformation propagating feature may comprise a third scallop in the support shelf. The fourth section of the deformation propagating feature may comprise a fourth scallop in the support shelf.

More specifically, the first scallop may be provided adjacent a longitudinal midline of the crushable space. The second scallop may be provided at a first inboard corner of the crushable space. The third scallop may be provided at a second inboard corner of the crushable space. The fourth scallop may be provided adjacent the intersection of the outboard side and the end of the outer wall.

The first deformation initiating feature may include a first series of slits in the outer wall adjacent the longitudinal midline of the crushable space. The second deformation initiating feature may include a second series of slits in the outer wall at the corner.

The fracture initiating feature may comprise a first notch at the end of the outer wall and a second notch adjacent the curve of the outer wall. In at least one of the many possible embodiments of the armrest assembly, the fracture initiating feature may further include at least one additional notch in an inboard side of the outer wall.

In any of the possible embodiments of the armrest assembly, the armrest assembly may further comprise an armrest cushion layer supported on the support shelf and a cover layer overlying the armrest cushion layer. That cover layer is adapted to provide an aesthetically pleasing appearance and a desirable tactile sensation when touched by an occupant of the motor vehicle.

In the following description, there are shown and described several preferred embodiments of the armrest assembly. As it should be realized, the armrest assembly is capable of other, different embodiments and its several details are capable of modification in various, obvious aspects all without departing from the armrest assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the armrest assembly and together with the description serve to explain certain principles thereof.

Reference will now be made in detail to the present preferred embodiments of the armrest assembly, examples of which are illustrated in the accompanying drawing figures.

DETAILED DESCRIPTION

Figure 1:
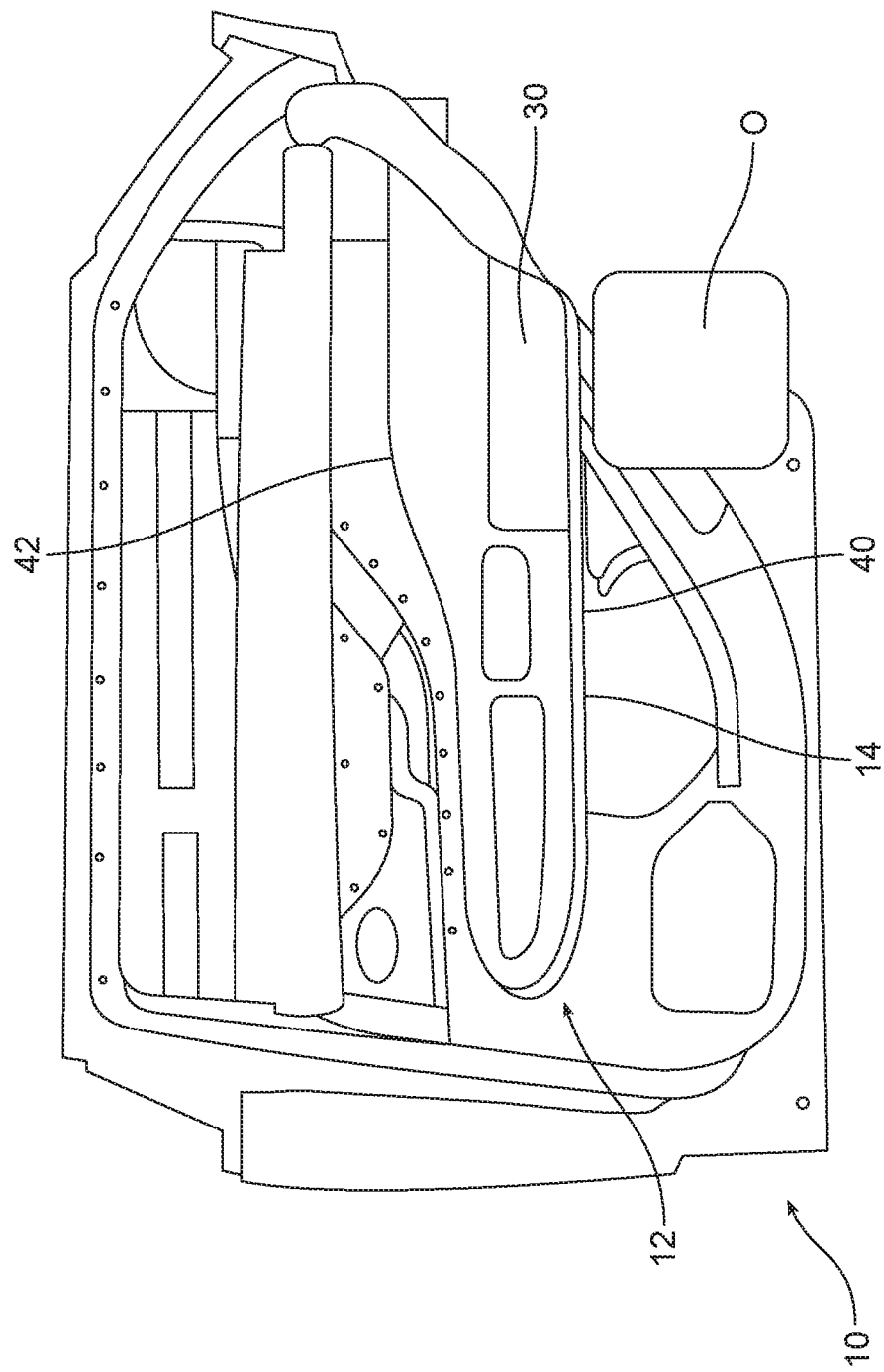
FIG. 1 is a detailed illustration of a motor vehicle door assembly incorporating the new and improved armrest assembly.
Figure 2:
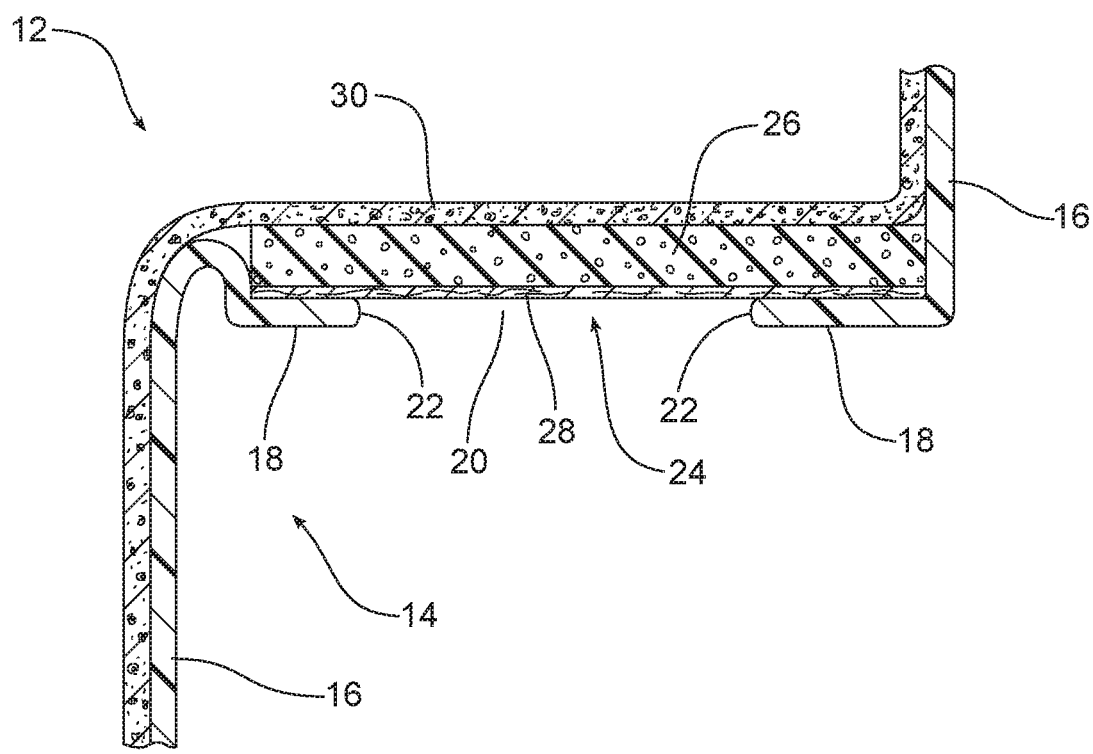
FIG. 2 is a cross-sectional view of the armrest assembly illustrated in FIG. 1 depicting the body of the armrest assembly, including the support shelf of the body that supports the cushioning layer and cover layer of the armrest assembly.

Reference is now made to FIGS. 1 and 2. FIG. 1 illustrates a motor vehicle door assembly 10 that incorporates the new and improved armrest assembly 12. As illustrated in FIG. 1, the armrest assembly 12 is secured to the motor vehicle door assembly 10 and is located immediately outboard of the motor vehicle occupant illustrated schematically at 0. As illustrated in FIG. 2, that armrest assembly 12 includes a body 14 including an outer wall 16 and a support shelf 18. The body 14 outlines a crushable space 20. More particularly, the inner margin 22 of the support shelf 18 borders the crushable space 20.

The armrest assembly 12 also includes an armrest cushion layer 24 that is received on and supported by the support shelf 18. That support shelf 18 may be inset with respect to the surrounding outer wall 16. In the illustrated embodiment, the armrest cushion layer comprises a layer of foam rubber 26 adhered to a support substrate 28 of fabric or other appropriate material.

The armrest assembly 12 also includes a cover layer 30 that overlies the armrest cushion layer 24 and at least part of the body 14. The cover layer 30 comprises a material that provides both an aesthetically pleasing appearance and a desired tactile feel when a motor vehicle occupant touches the armrest assembly 12. In the illustrated embodiment, the cover layer 30 is leather but it should be appreciated that it may be made from other appropriate material that may be adhered or otherwise connected to the body 14 so as to overly the armrest cushion layer 24.

Figure 3:
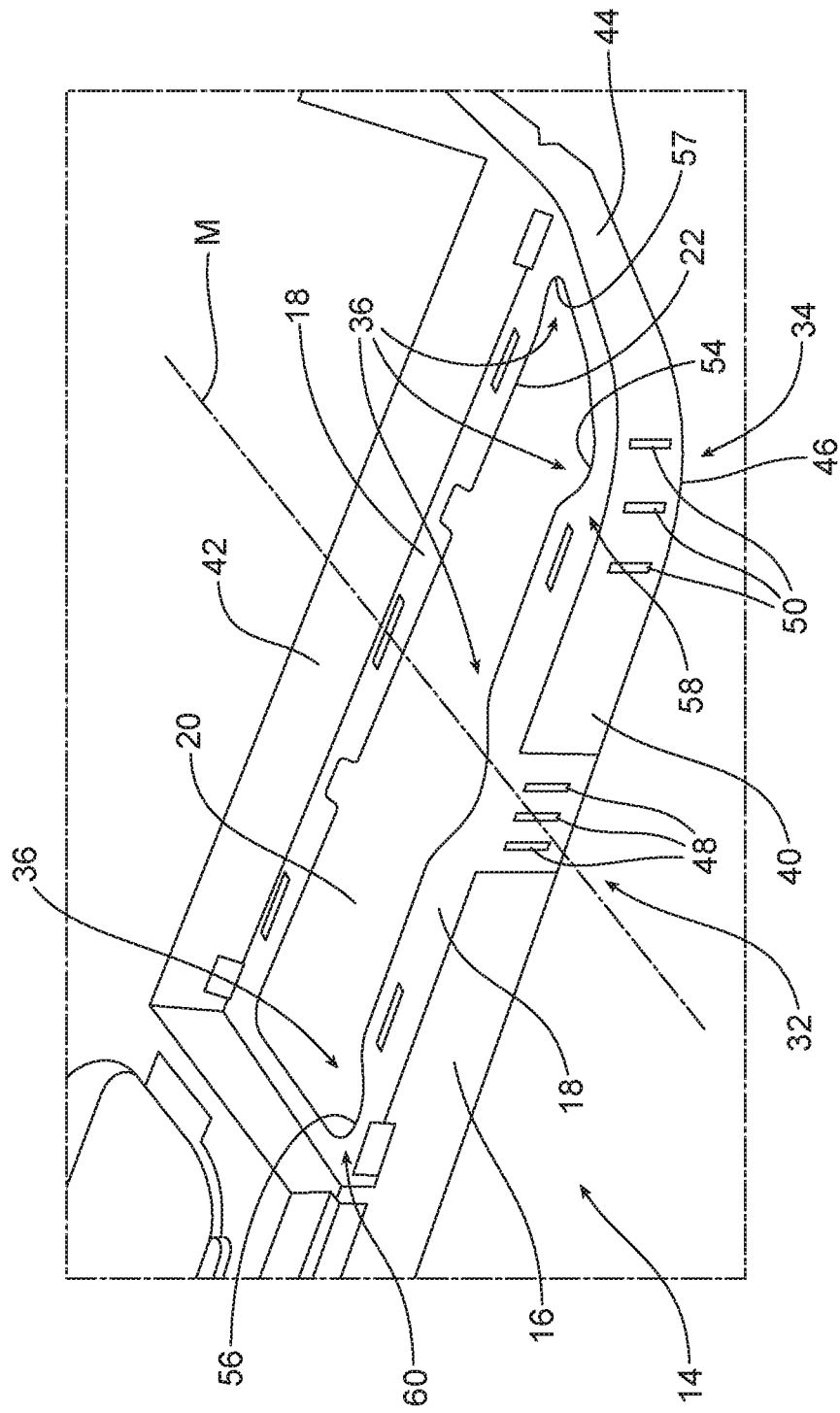
FIG. 3 is a detailed overhead perspective view of the body of the armrest assembly.
Figure 4:
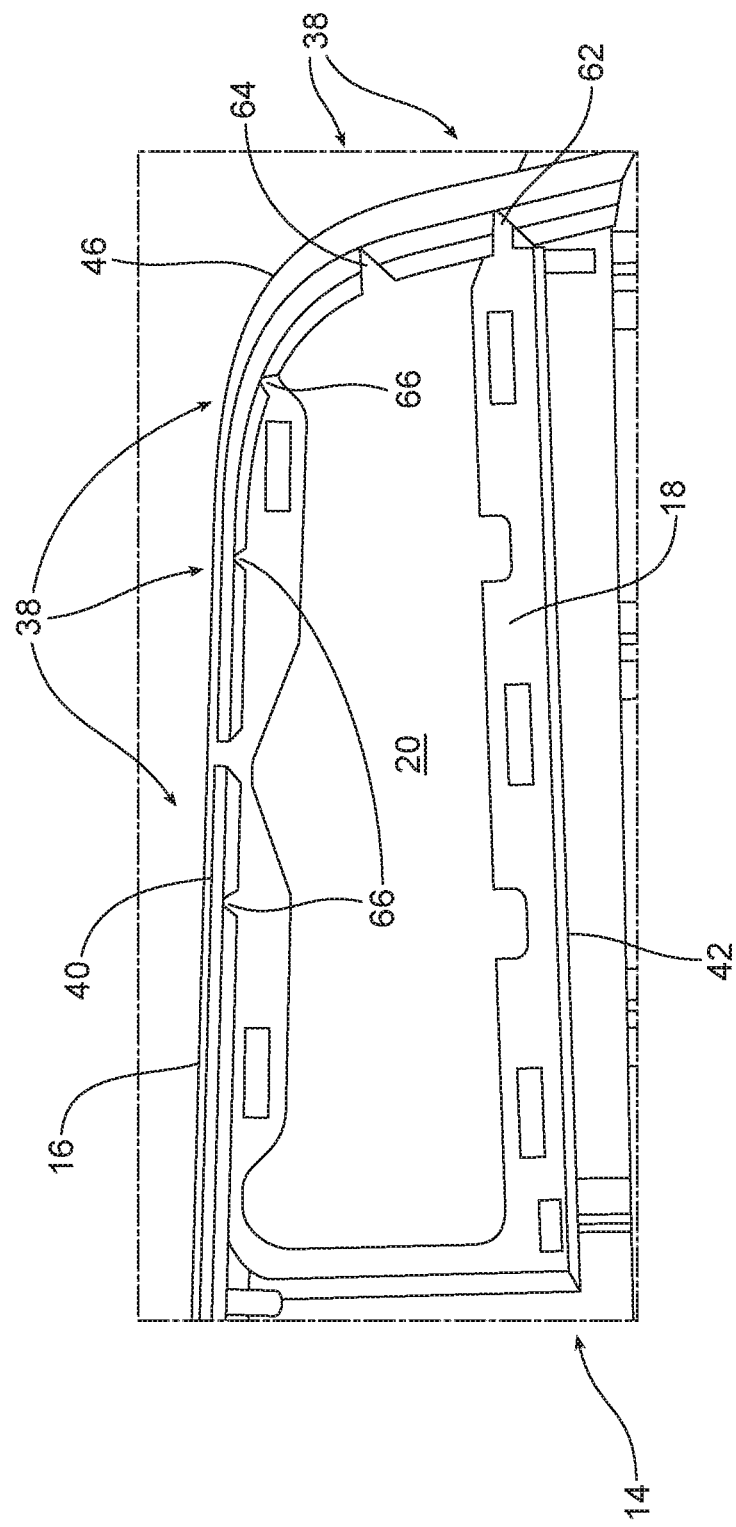
FIG. 4 is a detailed bottom plan view of the body of the armrest assembly.

As best illustrated in FIGS. 3 and 4, the body 14 includes a number of different engineered features adapted or configured to reduce the lateral bending stiffness of the armrest assembly 12 by dictating the deformation behavior of the armrest assembly in the event of a side-impact to the motor vehicle. Toward this end, the illustrated embodiment of the body 14 of the armrest assembly 12 includes a first deformation initiating feature 32, a second deformation initiating feature 34, a deformation propagating feature 36 and a fracture initiating feature 38. All of these features 32, 34, 36, 38 are provided at spaced locations around the crushable space 20 and are adapted to provide a sequence of actions to dictate and control the deformation of the armrest assembly 12 in response to a side impact in a way that allows for maximum energy absorption. As a result, load or force potentially transmitted to an occupant O through the armrest assembly 12 as a result of a side impact is reduced.

More particularly, in the illustrated embodiment, the outer wall 16 includes an inboard side 40, an outboard side 42 and an end 44. The outer wall 16 includes a curve 46 at the intersection of the inboard side 40 and the end 44. As should be appreciated, the inboard side 40 is closest to the motor vehicle occupant O seated next to the armrest assembly 12 with the outboard side opposite the inboard side.

The first deformation initiating feature 32 is provided in the outer wall 16 on the inboard side 40 inboard of the crushable space 20. The second deformation initiating feature 34 is provided at the curve 46.

More particularly, in the illustrated embodiment, the first deformation initiating feature 32 comprises a series of spaced parallel slits 48 in the outer wall 16 extending substantially vertically along the Z-axis of the motor vehicle. The second deformation initiating feature 34 comprises a second series of spaced parallel slits 50 provided in the outer wall 16 at the curve 46. The second series of parallel slits 50 also extend substantially vertically along the Z-axis of the motor vehicle.

In the illustrated embodiment, the deformation propagating feature 36 is provided in the support shelf 18 and, more particularly, in the inner margin 22 of the support shelf 18 on the inboard side of the crushable space 20.

More particularly, in the illustrated embodiment, the deformation propagating feature 36 comprises a first section/first scallop 52, a second section/second scallop 54, a third section/third scallop 56 and a fourth section/fourth scallop 57. The first section/first scallop 52 is provided adjacent to and immediately outboard the first deformation initiating feature 32. The second section/second scallop 54 is provided adjacent and immediately outboard the second deformation initiating feature 34. The third section/third scallop 56 is provided spaced from the first section/first scallop 52 and second section/second scallop 54. The fourth section/fourth scallop 57 is provided adjacent the intersection of the outboard side 42 and the end 44 of the outer wall 16.

More particularly, the first deformation initiating feature 32 and the first section/first scallop 52 of the deformation propagating feature 36 are provided adjacent the longitudinal midline M of the crushable space 20. The second deformation initiating feature 34 and second section/second scallop 54 of the deformation propagating feature 36 are provided at the first inboard corner 58 of the crushable space 20. The third section/third scallop 56 of the deformation propagating feature 36 is provided at the second inboard corner 60 of the crushable space 20.

In the illustrated embodiment of the armrest assembly 12, the fracture initiating feature 38 comprises a first notch 62 in the end 44 of the outer wall 16 and a second notch 64 adjacent the curve 46 of the outer wall. Further, as best illustrated in FIG. 4, the fracture initiating feature 38 may further include one or more additional notches 66 in the inboard side of the outer wall 16.

Figure 5:
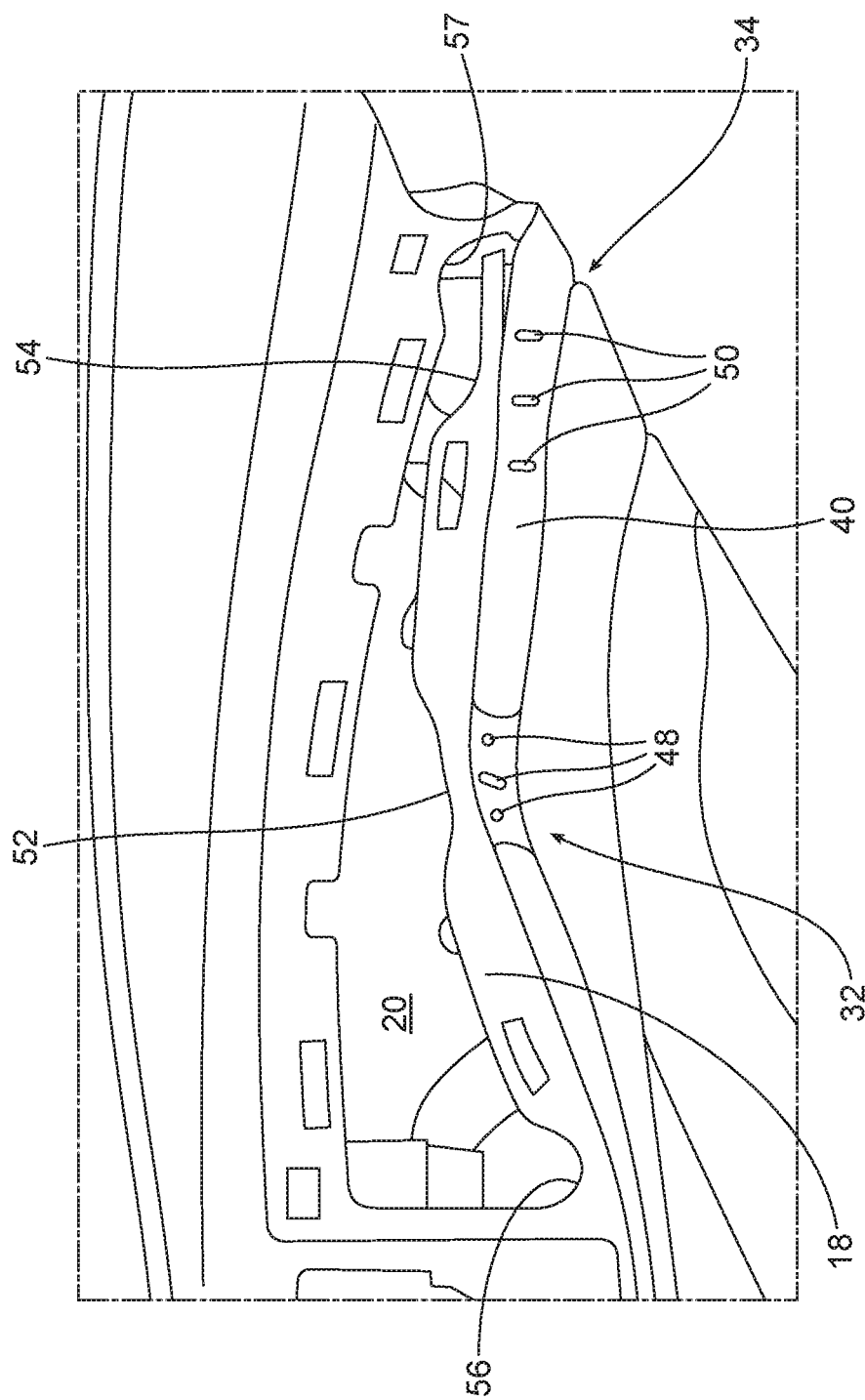
FIG. 5 is a top plan illustration of the armrest assembly illustrated in FIGS. 1-4 shown in a crushed condition in response to a side impact.

In the event of a side impact of sufficient force, the armrest assembly 12 is designed to provide controlled deformation through a sequence of actions of the features 32, 34, 36 and 38. More particularly, upon a side impact causing armrest assembly intrusion, the first deformation initiating feature 32 and second deformation initiating feature 34 induce bending of the armrest assembly 12. That bending is then propagated and shaped by the action of the deformation propagating feature 36, including the first section/first scallop 52, second section/second scallop 54 and third section/third scallop 56. As this occurs, the crushable space 20 allows for and enhances the bending of the armrest assembly 12 including the outer wall 16 and support shelf 18 of the body 14. When the armrest assembly 12 reaches the maximum bending limit the fracture initiating features 38, including the first notch 62, the second notch 64 and the additional notches 66, initiate fracturing of the outer wall 16 that further reduces any load that might be transferred to the vehicle occupant O through the intrusion caused by the side impact. FIG. 5 illustrates the body 14 of the armrest assembly 12 in a crushed configuration following a side impact event.

In one of the many possible embodiments of the armrest assembly 12, the first deformation initiating feature 32 includes three slits 48. Each of those slits 48 has a length of about 13.6 mm and a width of about 1.2 mm. The slits 48 are spaced apart by about 13.1 mm. The slits 50 of the second deformation initiating feature 34 may have a similar or even identical configuration.

The first section/first scallop 52 may have a radius of curvature of about 9.9 mm. The second section/second scallop 54 may have a radius of curvature of about 12.2 mm. The third section/third scallop 56 may have a radius of curvature of about 6.9 mm. The fourth section/fourth scallop 57 may have a radius of curvature of about 5.3 mm.

The crushable space 20 may have an overall length of about 185.1 mm, a width of about 42.5 mm at a wide end thereof and a width of about 33.2 mm at a narrow end thereof.

The fracture initiating feature 38 may include five notches 62, 64, 66 1.9 mm deep and 1.9 mm wide at the widest end. The notches may be placed 33 mm apart.

The preceding dimensions are merely presented for purposes of illustration. They are not to be considered limiting in scope. In fact, (a) the location, length, width and spacing of the slits 48, 50, (b) the location, spacing, shape and radius of curvature of the sections/scallops 52, 54, 56, 57, (c) the size and shape of the crushable space 20, (d) the size (width, depth), shape, location and number of notches 62, 64, 66 and the thickness of the outer wall 16 and support shelf 18 of the body 14 may all be adjusted or altered to fine tune the performance characteristics of any particular armrest assembly 12 for any particular motor vehicle application.

Figure 6:
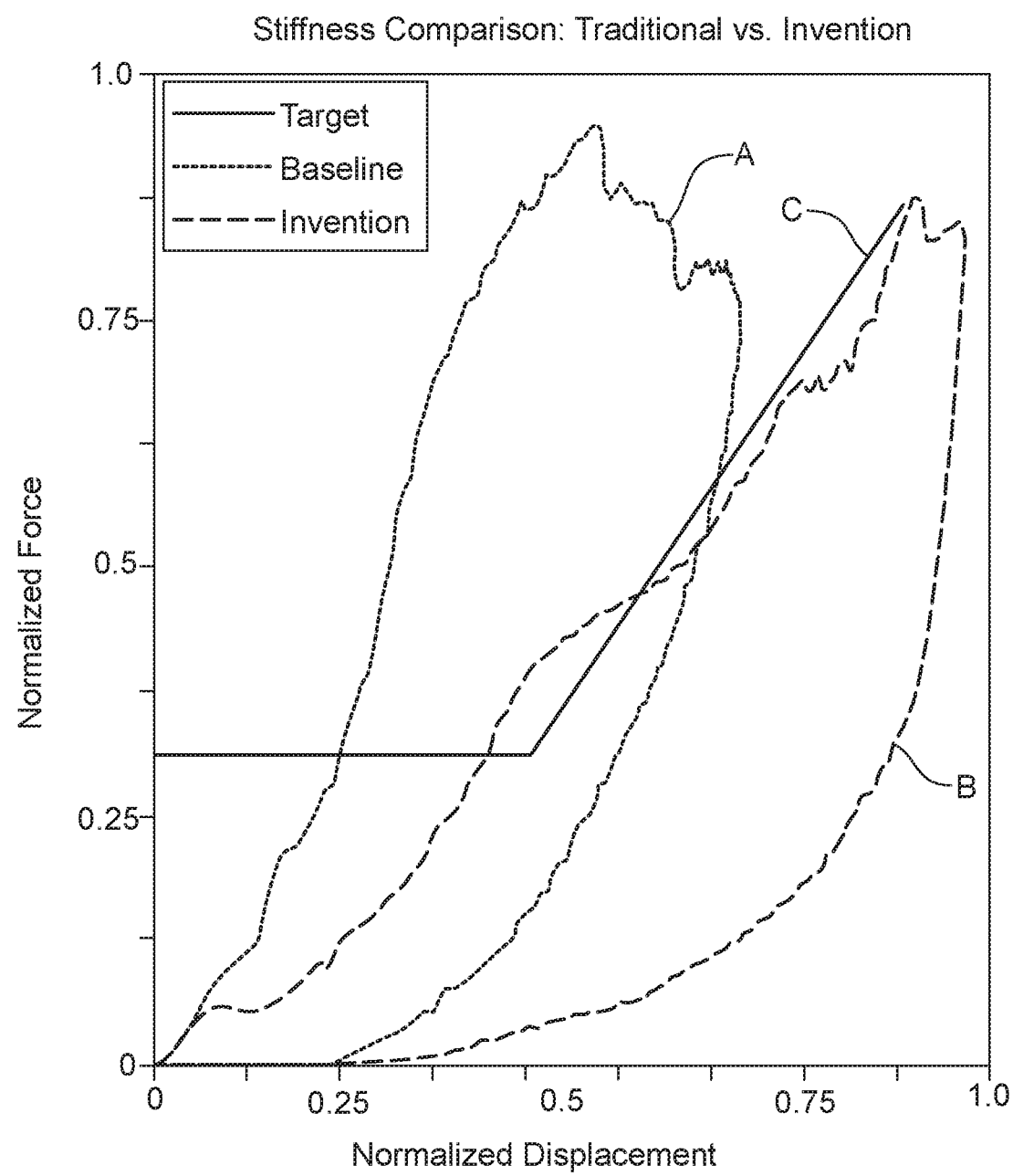
FIG. 6 is a plot of normalized force and normalized displacement illustrating a stiffness comparison between a traditional armrest assembly and the new and improved armrest assembly illustrated in FIGS. 1-4.

Reference is now made to FIG. 6 which is a plot of normalized displacement versus normalized force that effectively illustrates a stiffness comparison between an armrest assembly of traditional design illustrated by line A and the new and improved armrest assembly 12 (described herein and illustrated in FIGS. 1-5) illustrated by line B. Line C indicates a target of performance that provides for enhanced safety to a motor vehicle occupant O seated next to the armrest assembly 12.

As should be appreciated from reviewing FIG. 6, shortly after displacement of the armrest assembly is initiated by the side impact, the first deformation initiating feature 32 and second deformation initiating feature 34 initiate bending thereby absorbing energy and shifting the force curve to the right (note action arrow D). As displacement continues, the deformation of the armrest assembly is propagated by the deformation propagating feature 36 including the first section/first scallop 52, the second section/second scallop 54, and the third section/third scallop 56 thereby further shifting the force curve the right (note action arrow E). As displacement of the armrest assembly continues, the fracture initiating feature 38, including the first notch 62, the second notch 64 and the additional notches 66 initiate fracture of the outer wall 16 of the body 14 thereby further dissipating energy and shifting the force curve to the right as shown by action arrow F. When one compares the force curve A for the traditional armrest assembly to the force curve B for the new and improved armrest assembly 12, it is clear that the new and improved armrest assembly 12 is characterized by a lower peak force that is distributed over a longer timeframe. That benefits the occupant O seated next to the new and improved armrest assembly 12.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An armrest assembly, comprising:
a body outlining a crushable space, said body including an outer wall, a support shelf inside said outer wall wherein an inner margin of said support shelf borders said crushable space, a first deformation initiating feature provided in said outer wall, a deformation propagating feature provided in said support shelf and a fracture initiating feature provided at spaced locations around said crushable space.

2. The armrest assembly of claim 1, wherein said fracture initiating feature is provided in said outer wall.

3. The armrest assembly of claim 2, wherein said first deformation initiating feature is provided in said outer wall on said inboard side of said crushable space.

4. The armrest assembly of claim 3, wherein said deformation propagating feature is provided in said inner margin of said support shelf on an inboard side of said crushable space.

5. The armrest assembly of claim 4, wherein said fracture initiating feature is provided in said outer wall along an end of said outer wall extending between said inboard side and an outboard side of said outer wall.

6. The armrest assembly of claim 5, wherein said outer wall includes a curve at an intersection of said inboard side and said end.

7. The armrest assembly of claim 6, wherein a second deformation initiating feature is provided at said curve.

8. The armrest assembly of claim 7, wherein said deformation propagating feature includes a first section adjacent said first deformation initiating feature and a second section adjacent said second deformation initiating feature.

9. The armrest assembly of claim 8, wherein said deformation propagating feature includes a third section spaced from said first section and said second section and a fourth section spaced from said first section, said second section and said third section.

10. The armrest assembly of claim 9, wherein said first deformation initiating feature includes a first series of slits in said outer wall adjacent a longitudinal midline of said crushable space.

11. The armrest assembly of claim 10, wherein said second deformation initiating feature includes a second series of slits in said outer wall at said corner.

12. The armrest assembly of claim 11, wherein said first section of said deformation propagating feature comprises a first scallop in said support shelf, said second section of said deformation propagating feature comprises a second scallop in said support shelf, said third section of said deformation propagating feature comprises a third scallop in said support shelf and said fourth section of said deformation propagating feature comprises a fourth scallop in said support shelf.

13. The armrest assembly of claim 12, wherein said first scallop is provided adjacent said longitudinal midline of said crushable space, said second scallop is provided at a first inboard corner of said crushable space, said third scallop is provided at a second inboard corner of said crushable space and said fourth scallop is provided adjacent an intersection of said end and an outboard side of said outer wall.

14. The armrest assembly of claim 13, wherein said fracture initiating feature comprises a first notch at said end of said outer wall and a second notch adjacent said curve of said outer wall.

15. The armrest assembly of claim 14, wherein said fracture initiating feature further includes at least one additional notch in said inboard side of said outer wall.

16. The armrest assembly of claim 15, further comprises an armrest cushion layer supported on said support shelf and a corner layer overlying said armrest cushion layer.

17. An armrest assembly, comprising:
 a body outlining a crushable space, said body including an outer wall, a support shelf inside said outer wall, a first deformation initiating feature, a deformation propagating feature provided in said support shelf and a fracture initiating feature provided in said outer wall at spaced locations around said crushable space.

18. The armrest assembly of claim 17, wherein said first deformation initiating feature is provided in said outer wall.

\* \* \* \* \*